United States Patent
Qin et al.

(10) Patent No.: US 6,657,348 B2
(45) Date of Patent: Dec. 2, 2003

(54) ROTOR SHIELD FOR MAGNETIC ROTARY MACHINE

(75) Inventors: Dinyu Qin, Chatsworth, CA (US); Matthew Stewart, Moorpark, CA (US); David A. Stahl, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/985,439

(22) Filed: Nov. 2, 2001

(65) Prior Publication Data

US 2002/0125779 A1 Sep. 12, 2002

Related U.S. Application Data

(60) Provisional application No. 60/246,380, filed on Nov. 7, 2000, and provisional application No. 60/245,697, filed on Nov. 2, 2000.

(51) Int. Cl.[7] .................................................. H02K 1/27
(52) U.S. Cl. .......................... 310/156.28; 310/156.02; 310/15.03; 310/156.05; 310/156.74; 310/156.75
(58) Field of Search ....................... 310/156.02, 156.03, 310/156.05, 156.28, 156.74, 156.75

(56) References Cited

U.S. PATENT DOCUMENTS

| | | | |
|---|---|---|---|
| 3,593,049 A | 7/1971 | Dittrich ........................ 310/40 |
| 3,727,302 A | 4/1973 | Phelon ................... 310/154.13 |
| 3,789,250 A | 1/1974 | Macoit et al. ......... 310/154.13 |
| 4,012,651 A | 3/1977 | Burson ........................ 310/153 |
| 4,117,360 A | 9/1978 | Richter ........................ 310/183 |
| 4,146,809 A | 3/1979 | Rielly ........................ 310/261 |
| 4,227,105 A | 10/1980 | Kumakura ................... 310/153 |
| 4,433,261 A | * 2/1984 | Nashiki et al. ............. 310/156 |
| 4,636,107 A | 1/1987 | Casler et al. ................ 411/477 |
| 4,729,160 A | 3/1988 | Brown ........................ 29/598 |
| 4,916,344 A | * 4/1990 | Hammer et al. ............. 310/154 |
| 4,933,583 A | * 6/1990 | Ripplinger .................. 310/156 |
| 4,953,284 A | 9/1990 | Hammer et al. ............... 29/596 |
| 5,038,065 A | 8/1991 | Matsubayashi et al. ..... 310/162 |
| 5,091,668 A | 2/1992 | Cuenot et al. .......... 310/156.62 |
| 5,485,045 A | * 1/1996 | Canders et al. ............. 310/156 |
| 5,528,095 A | 6/1996 | Strobl .................... 310/156.12 |
| 5,563,463 A | * 10/1996 | Stark ........................... 310/156 |
| 5,568,023 A | 10/1996 | Grayer et al. ................ 318/139 |
| 5,801,470 A | * 9/1998 | Johnson et al. ............. 310/156 |
| 6,104,115 A | * 8/2000 | Offringa et al. ............. 310/156 |
| 6,219,199 B1 | * 4/2001 | Sakuragi et al. .......... 360/99.08 |
| 6,239,520 B1 | * 5/2001 | Stahl et al. .................... 310/61 |
| 6,244,835 B1 | 6/2001 | Antaki et al. ................ 417/356 |
| 6,441,523 B1 | * 8/2002 | Koharagi et al. ....... 310/156.28 |

* cited by examiner

*Primary Examiner*—Nestor Ramirez
*Assistant Examiner*—Leda T. Pham
(74) *Attorney, Agent, or Firm*—Pillsbury Winthrop LLP

(57) ABSTRACT

A magnet machine includes a magnet rotor. The rotor includes a sleeve and a magnet. The magnet is positioned within the sleeve. A highly electrically conductive, nonmagnetic shield surrounds the magnet. The shield reduces rotor eddy current losses and lowers rotor operating temperature, thereby improving efficiency of the machine.

28 Claims, 11 Drawing Sheets

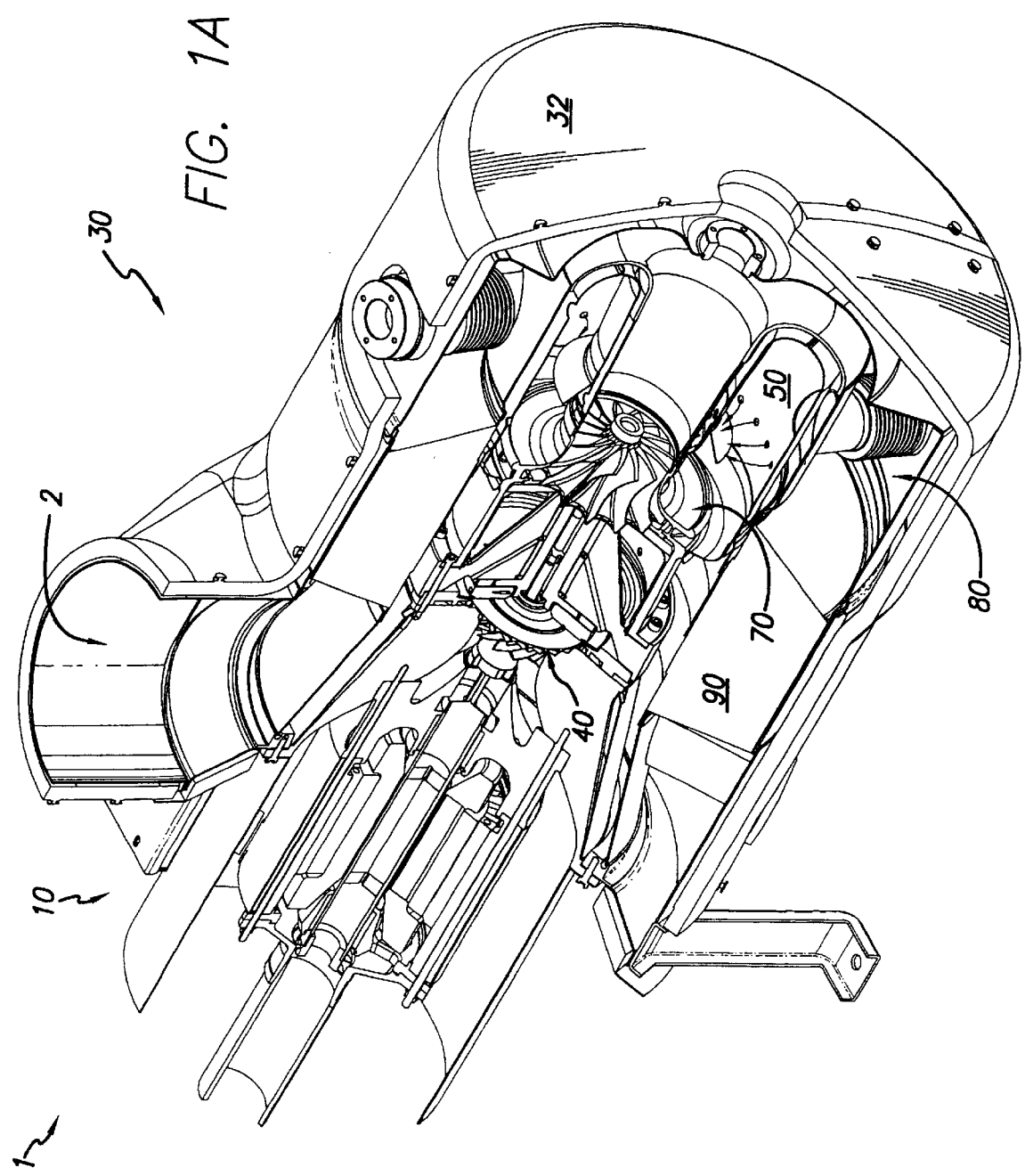

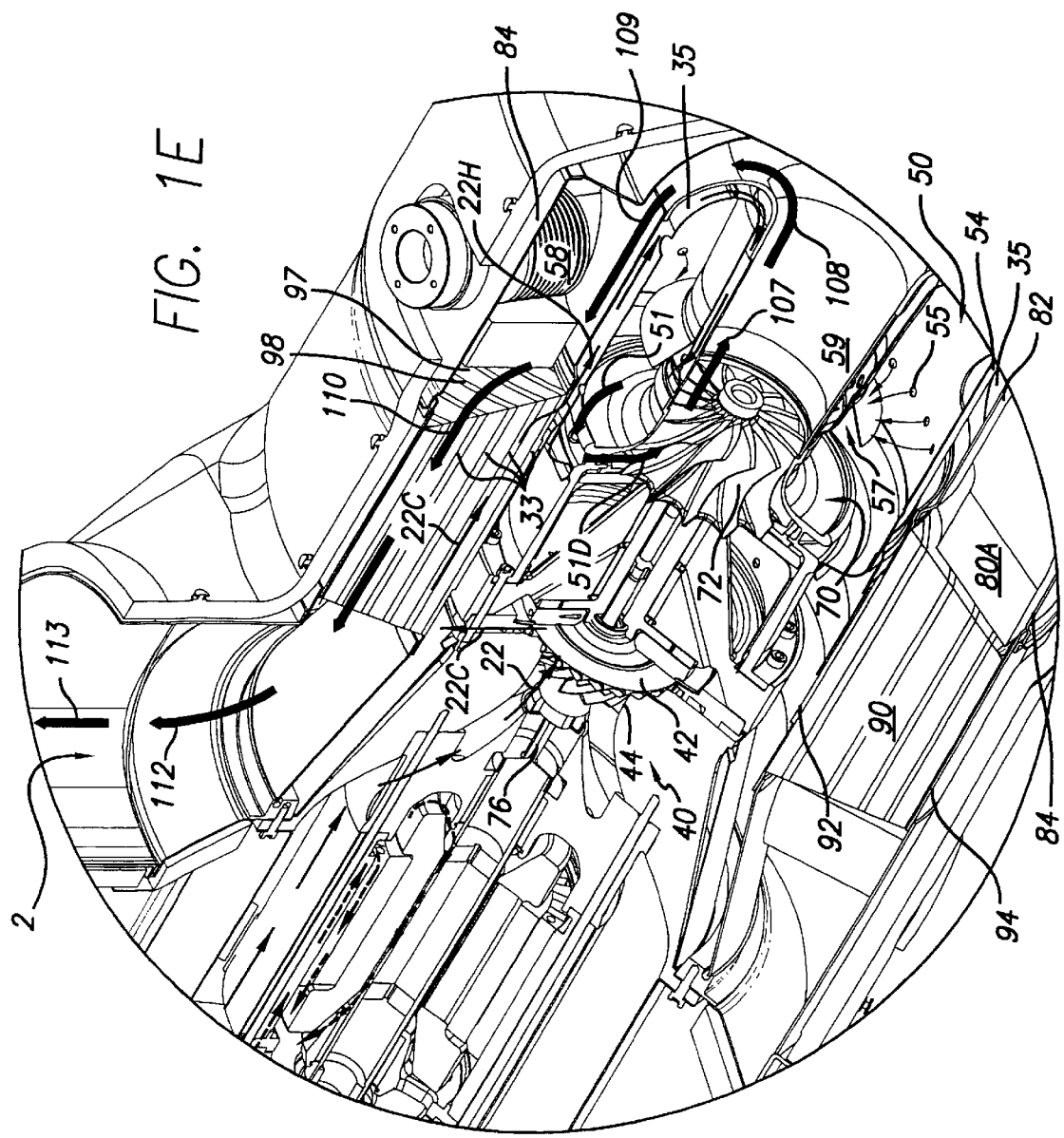

ROTOR SHIELD FOR MAGNETIC ROTARY MACHINE

CROSS REFERENCE TO RELATED APPLICATIONS

This patent application claims the priority of provisional patent applications Ser. No. 60/245,697, filed Nov. 2, 2000, and Ser. No. 60/246,380 filed Nov. 7, 2000.

BACKGROUND OF THE INVENTION

1. Field of the Invention

The present invention relates generally to magnetic rotary machines. More particularly, the invention relates to a rotor system for limiting eddy current losses and lowering operating temperature.

2. Discussion of the Background

Magnetic rotary machines include a stator with a rotatable rotor positioned therein and supported by bearings.

The rotor may be subject to eddy current losses caused by magnetic field harmonics. The term eddy current losses means heat generated by eddy currents. Magnetic field harmonics are oscillations in the magnetic field at any frequency other than the fundamental frequency. The term "winding harmonics" means magnetic field harmonics caused by stator windings. The term "tooth ripple harmonics" are magnetic field harmonics which occur in a stator with teeth, and which depend upon stator tooth-slot spatial distribution.

What is needed is a technique to reduce eddy current losses and lower operating temperature of the magnet.

SUMMARY OF THE INVENTION

In one aspect of the invention, a turbogenerator system is described wherein the system includes (1) a turbine mounted for rotation on a shaft; (2) a sleeve coupled with said shaft for rotation therewith; (3) a stator surrounding said sleeve; (4) at least one permanent magnet mounted within said sleeve; and (5) a shield surrounding said at least one permanent magnet, said shield made of electrically conductive nonmagnetic material.

In another aspect of the invention, a generator/motor is described wherein the generator/motor includes (1) a stator; (2) a sleeve mounted for rotation within said stator; (3) at least one permanent magnet positioned within said sleeve for rotation therewith; and (4) a shield surrounding said at least one permanent magnet to rotate therewith, said shield made of electrically conductive nonmagnetic material.

In another aspect of the invention, a permanent magnet apparatus is described wherein the apparatus includes (1) a stator; and (2) a permanent magnet rotor mounted for rotation within said stator, said rotor including a permanent magnet, an electrically conductive nonmagnetic shield and a sleeve.

In another aspect of the invention, a permanent magnet rotor is described wherein the apparatus includes (1) a cylindrical permanent magnet having a cylindrical permanent magnet outer surface; (2) an annular shield having an inner annular surface in contact with said cylindrical permanent magnet outer surface, said annular shield having an annular shield outer surface; (3) an annular sleeve having an annular sleeve inner surface in contact with said annular shield outer surface; and (4) wherein electrical resistivity of said shield is lower than electrical resistivity of said sleeve.

In another aspect of the invention, a method for reducing eddy current losses in a permanent magnet rotor is described wherein the method includes (1) providing a permanent magnet stator; (2) providing a permanent magnet rotor designed to rotate about an axis disposed within said stator, said rotor including a permanent magnet, an electrically conductive nonmagnetic shield and a sleeve, wherein said shield has portions positioned inside said sleeve; and (3) rotating said permanent magnet rotor such that said shield reduces said eddy current losses.

In another aspect of the invention, a method includes (1) providing a cylindrical permanent magnet having a cylindrical permanent magnet outer surface; (2) providing an annular shield having an inner annular surface in contact with said cylindrical permanent magnet outer surface, said annular shield having an annular shield outer surface; (3) providing an annular sleeve having an annular sleeve inner surface in contact with said annular shield outer surface, wherein resistivity of said shield is lower than resistivity of said sleeve; and (4) generating eddy currents in said shield such that said eddy current losses are reduced.

BRIEF DESCRIPTION OF THE DRAWINGS

Use of the present invention reduces rotor eddy current losses in a magnet rotary machine.

Use of the present invention reduces operating temperatures in a magnet rotary machine.

Figure 1B:
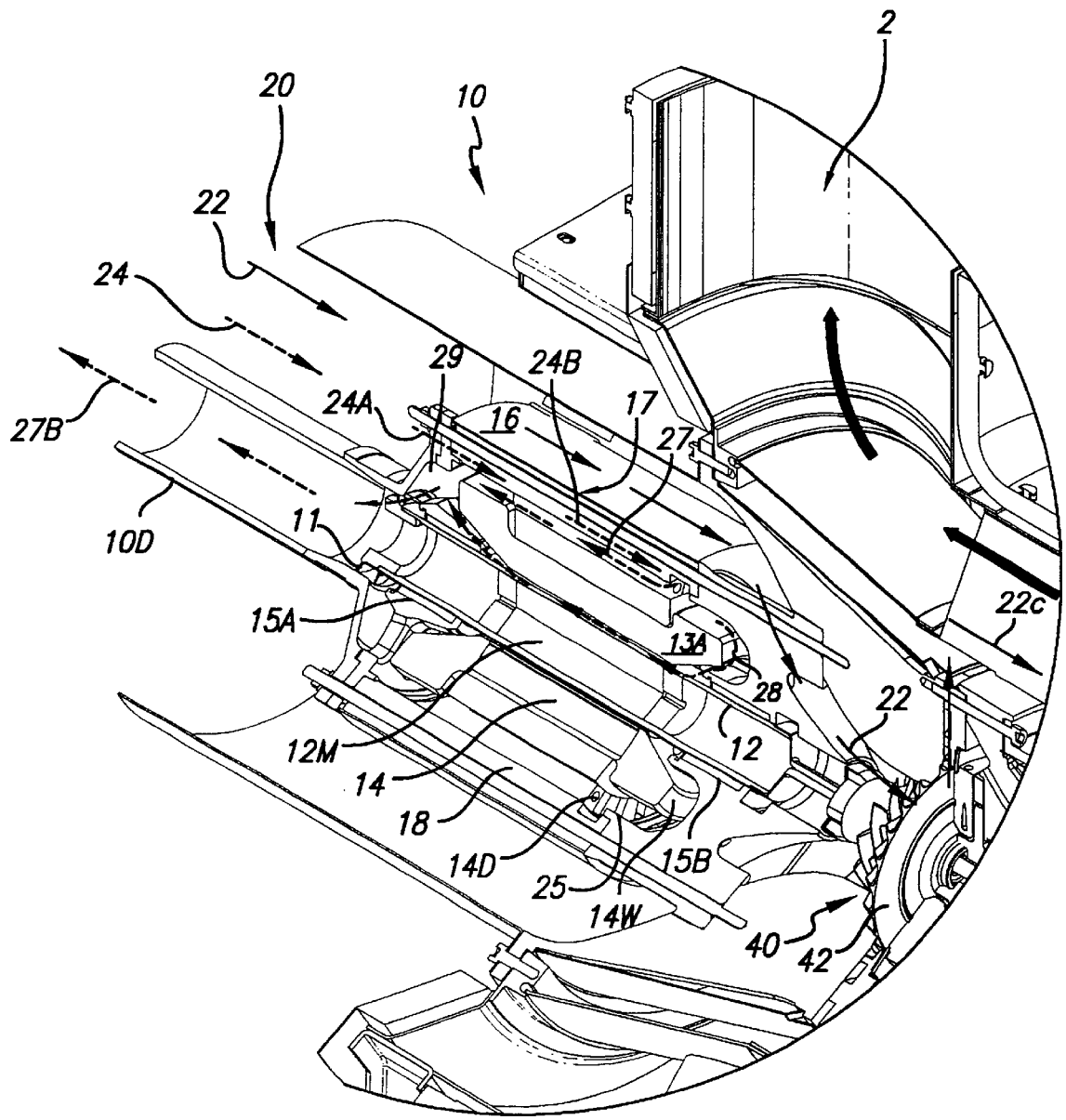
Figure 1C:
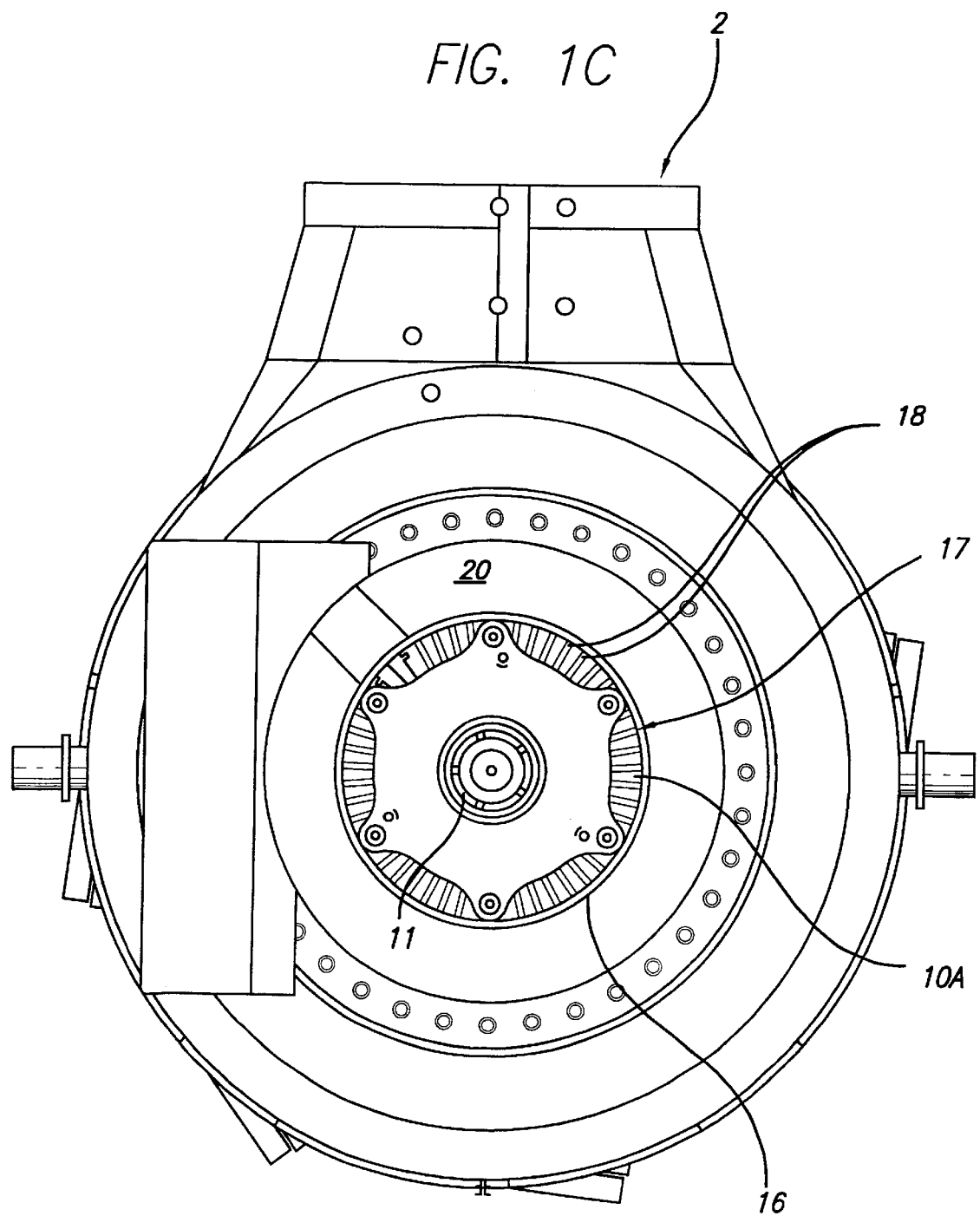
Figure 1D:
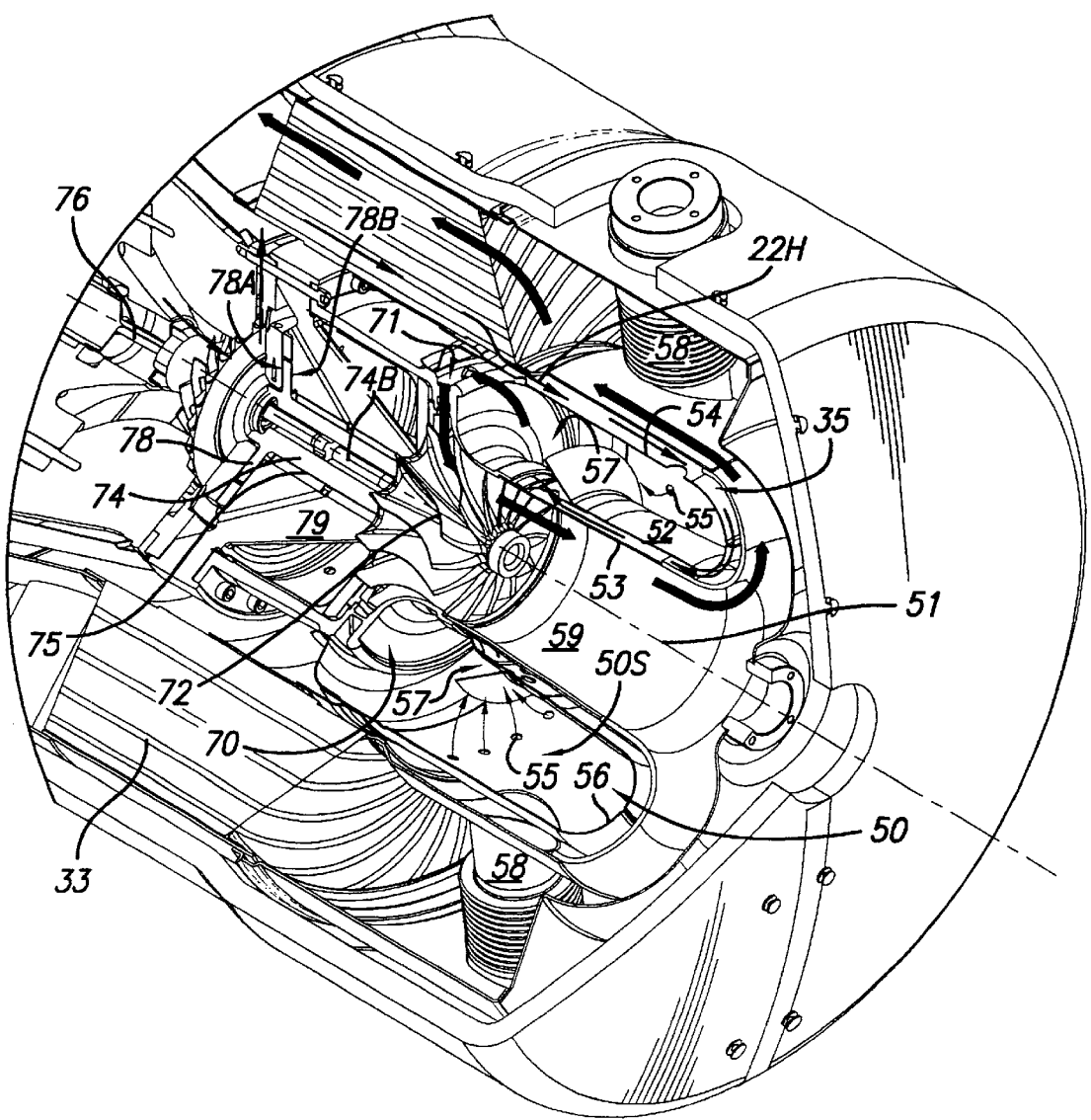
Figure 2:
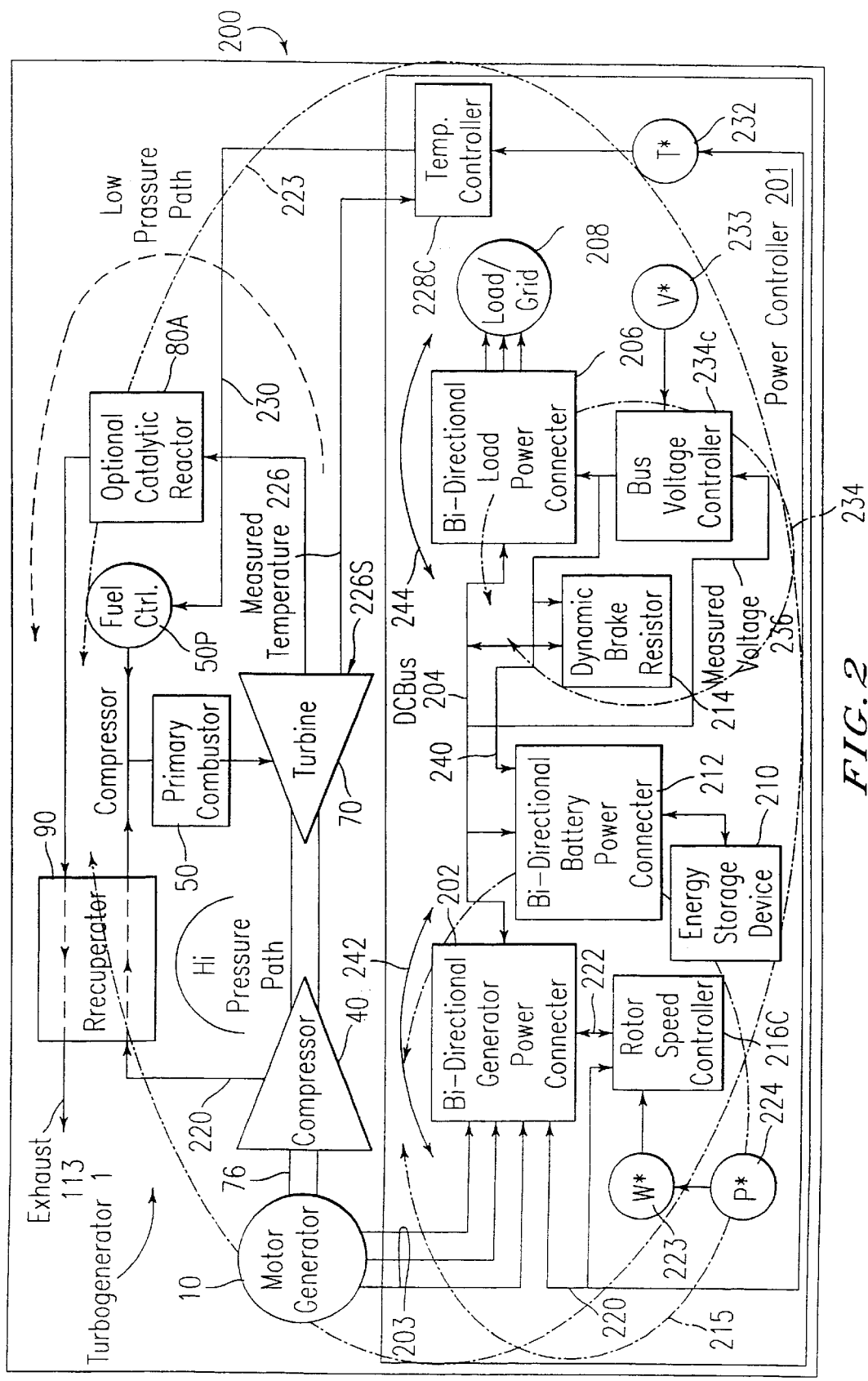
Figure 3A:
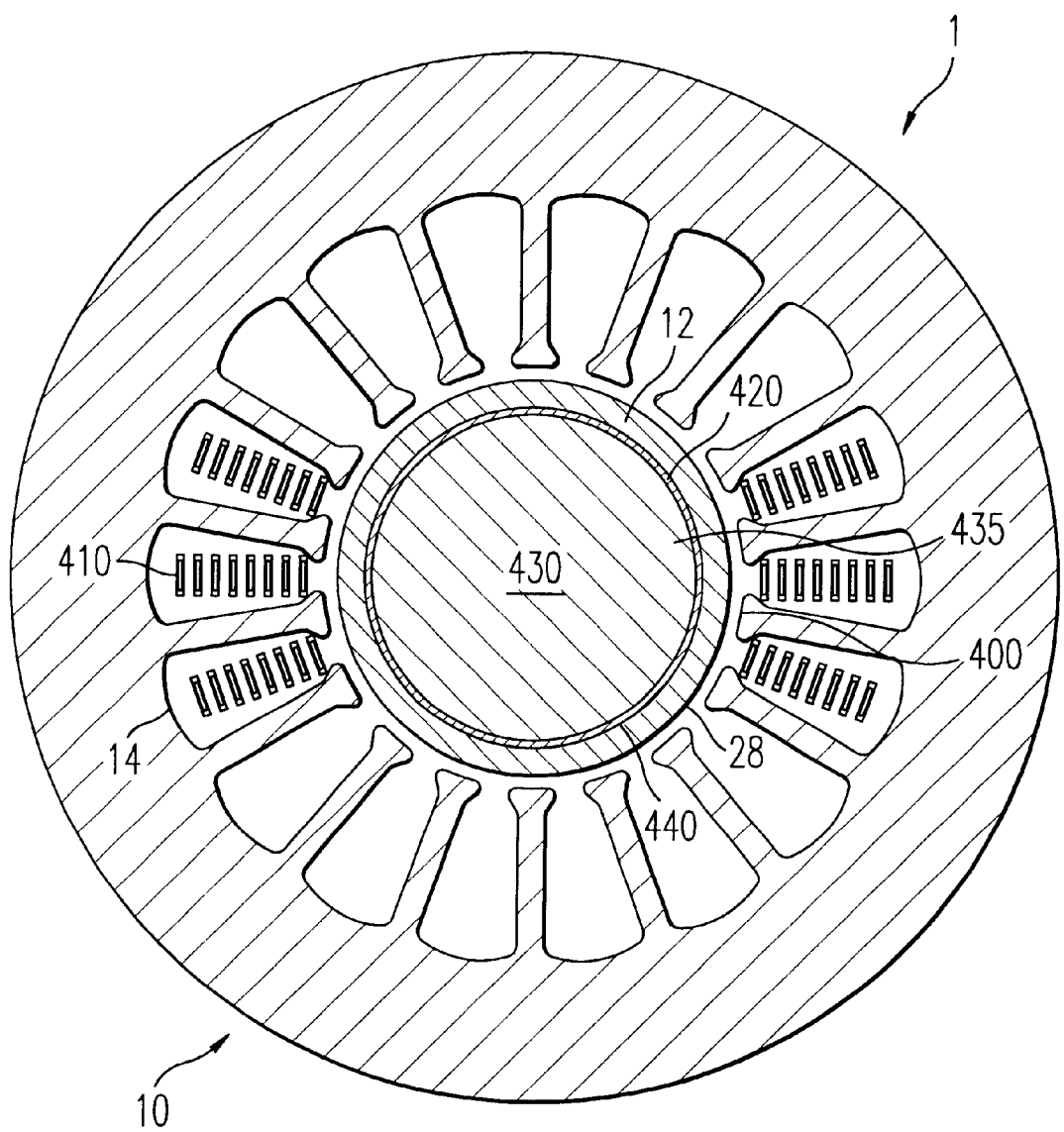
Figure 3B:
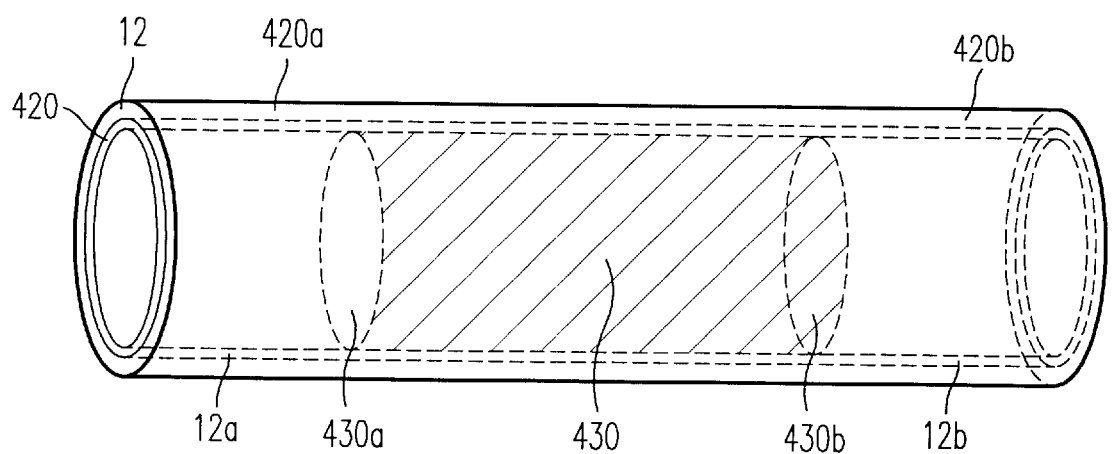
Figure 3C:
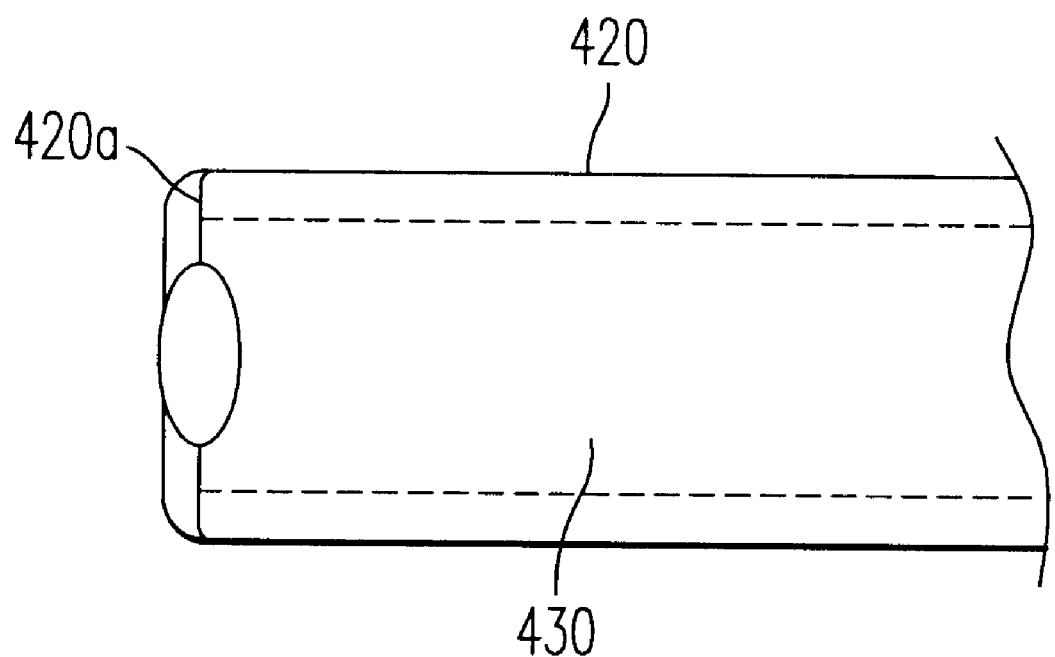

A more complete appreciation of the invention and many of the attendant advantages thereof will be readily obtained as the same becomes better understood by reference to the following detailed description when considered in connection with the accompanying drawings, wherein:

FIG. 1A is perspective view, partially in section, of an integrated turbogenerator system;

FIG. 1B is a magnified perspective view, partially in section, of the motor/generator portion of the integrated turbogenerator of FIG. 1A;

FIG. 1C is an end view, from the motor/generator end, of the integrated turbogenerator of FIG. 1A;

FIG. 1D is a magnified perspective view, partially in section, of the combustor-turbine exhaust portion of the integrated turbogenerator of FIG. 1A;

FIG. 1E is a magnified perspective view, partially in section, of the compressor-turbine portion of the integrated turbogenerator of FIG. 1A;

FIG. 2 is a block diagram schematic of a turbogenerator system including a power controller having decoupled rotor speed, operating temperature, and DC bus voltage control loops;

FIG. 3a is a cross-sectional view, taken through the permanent magnet generator portion of the turbogenerator of FIG. 1, of an alternate embodiment of permanent magnet rotor including a shield in accordance with the present invention;

FIG. 3b is a perspective view of an alternate embodiment of permanent magnet rotor including a shield extended beyond a magnet in accordance with the present invention;

FIG. 3c is a partial perspective view of an alternate embodiment of one end of permanent magnet rotor including a shield formed to cover ends of the permanent magnet in accordance with the present invention.

Figure 3D:
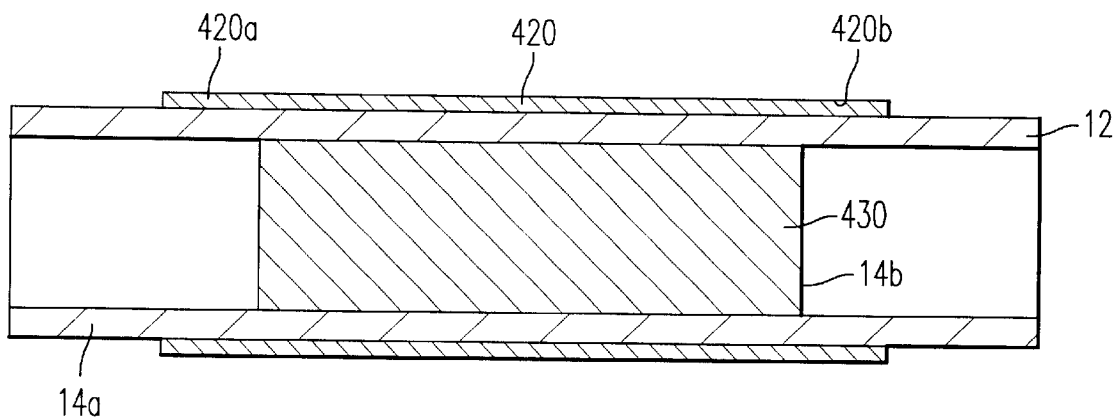

FIG. 3d is a sectional view of an alternate embodiment of permanent magnet rotor including shield located outside the sleeve.

Figure 3E:
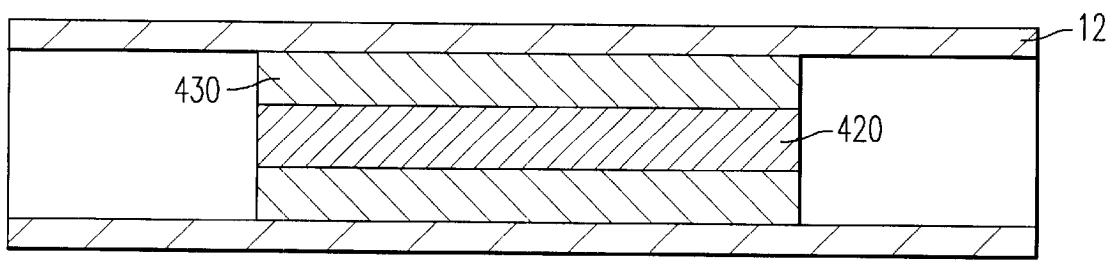

FIG. 3e is a sectional view of an alternate embodiment of permanent magnet rotor including shield disposed at the center of the rotor.

Figure 3F:
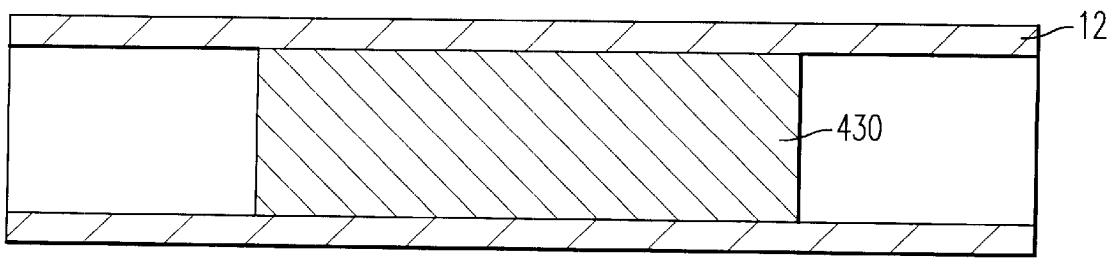

FIG. 3f is a sectional view of an alternate embodiment of permanent magnet rotor including sleeve made of electrically conductive nonmagnetic material.

Figure 4A:
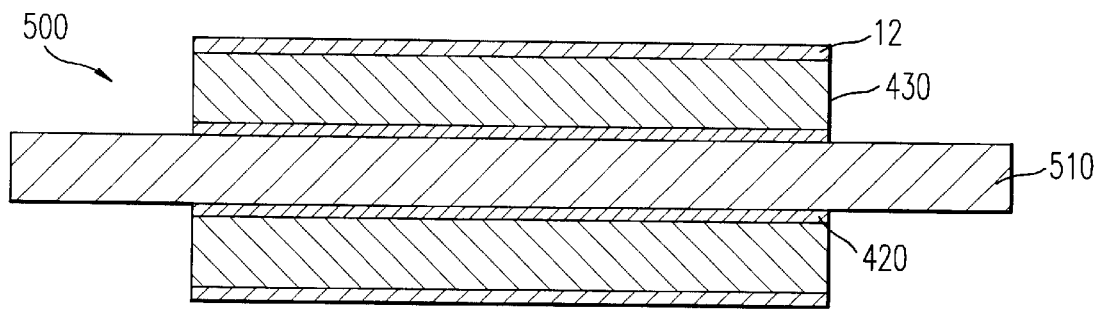

FIG. 4a is a sectional view of an alternate embodiment of permanent magnet rotor including a central shaft, magnet, sleeve and a shield disposed between magnet and shaft.

Figure 4B:
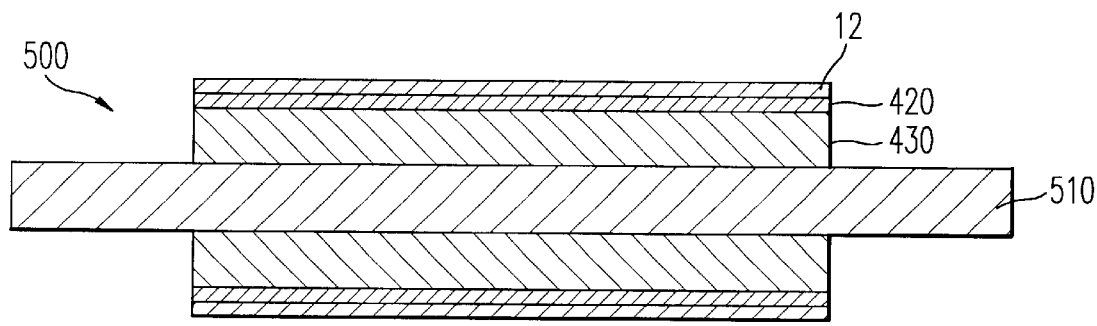

FIG. 4b is a sectional view of an alternate embodiment of permanent magnet rotor including a central shaft, magnet, sleeve and a shield disposed between magnet and sleeve.

Figure 4C:
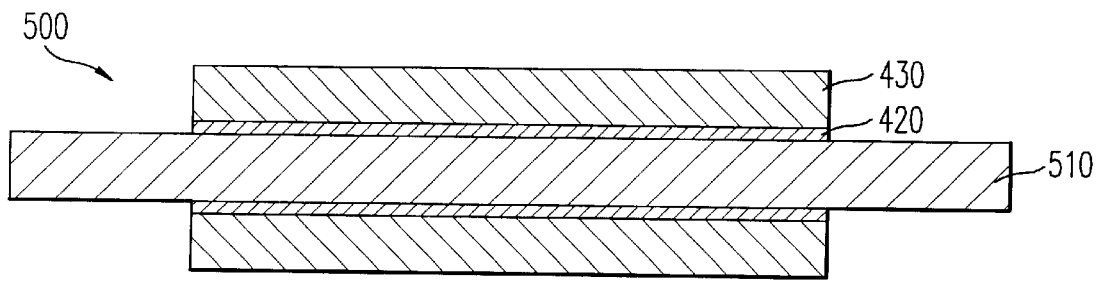

FIG. 4c is a sectional view of an alternate embodiment of permanent magnet rotor including a central shaft, magnet and a shield disposed between magnet and shaft.

DETAILED DESCRIPTION OF THE PREFERRED EMBODIMENT

Referring now to the drawings, like reference numerals designate identical or corresponding parts throughout the several views.

Mechanical Structural Embodiment of a Turbogenerator

With reference to FIG. 1A, an integrated turbogenerator 1 according to the present invention generally includes motor/generator section 10 and compressor-combustor section 30. Compressor-combustor section 30 includes exterior can 32, compressor 40, combustor 50 and turbine 70. A recuperator 90 may be optionally included.

Referring now to FIG. 1B and FIG. 1C, in an embodiment of the present disclosure, motor/generator section 10 may be a permanent magnet motor generator having a permanent magnet rotor or sleeve 12. Throughout the present disclosure rotor or sleeve 12 is referred to as a permanent magnet rotor, any suitable rotor technology may be used including wound rotors. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 51. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, Bearing rotor 74 and Compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 98 of recuperator 90, as indicated by gas flow arrows 108 and 109 respectively.

In an alternate embodiment, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

Alternative Use of the Invention Other than in Integrated Turbogenerators

An integrated turbogenerator is a turbogenerator in which the turbine, compressor, and generator are all constrained to rotate based upon rotation of the shaft to which the turbine is connected. The invention disclosed herein is preferably but not necessarily used in connection with a turbogenerator, and preferably but not necessarily used in connection with an integrated turbogenerator.

Turbogenerator System Including Controls

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power/converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Referring to FIG. 3a, it illustrates permanent magnet turbogenerator 1 including a permanent magnet motor or generator section 10. Permanent magnet generator 10 includes stator 14 and rotatable permanent magnet shaft or rotor 28. Stator 14 includes stator teeth 400. Rotor 28 includes permanent magnet rotor sleeve 12, shield 420, permanent magnet 430 and journal bearings 15A and 15B. Permanent magnet 430 may be a single piece or multiple pieces held together inside sleeve 12. The journal bearings rotatably support sleeve 12. Journal bearings 15A and 15B are preferably a compliant foil hydrodynamic fluid film-type of bearing, such as that described in U.S. Pat. No. 5,427,455, which is hereby incorporated by reference in its entirety.

Shield 420 may be disposed within rotor 28. Shield 420 may be located between the exterior surface 435 of magnet 430 and the inner surface 440 of sleeve 12. Accordingly, shield 420 would be spaced apart from stator teeth 430 by sleeve 12. Shield 420 may be sized and shaped in a configuration that cooperates with sleeve 12 and magnet 430. For example, sleeve 12 and magnet 430 may be substantially cylindrical, thus one preferred shape for shield 420 is a cylinder. In one embodiment, shield 420 would be plated to the inner surface of sleeve 12. In another embodiment, shield 420 would be a foil wrapped around magnet 430.

Permanent magnet 430 may be inserted into permanent magnet sleeve 12 with a radial interference fit by any number of conventional techniques, such as heating permanent magnet sleeve 12 and supercooling permanent magnet 430, hydraulic pressing, using pressurized lubricating fluids, tapering the inside diameter of the permanent magnet sleeve 12 and/or the outer diameter of the permanent magnet 430, and other similar methods or combinations thereof.

Referring now to FIG. 3b, it illustrates rotor 28 including sleeve 12, shield 420 and magnet 430. Shield 420 is disposed between sleeve 12 and magnet 430. Sleeve 12 and shield 430 have portions 12a, 12b, and 420a, 420b, respectively, that may extend beyond axial ends 430a, 430b of permanent magnet.

Referring now to FIG. 3c, it illustrates shield 420 and magnet 430. Shield 420 is assembled over magnet 430. Shield 420 may be interference fit to sleeve 12 by thermal fitting or hydraulic expansion of sleeve 12. Excess material 420a on the ends of sleeve 12 is swaged to bring shield 420 down over the axial end faces of the magnet 430. It should be appreciated, however, that any appropriate manufacturing method may be used. Excess material 420a may partially or completely cover the axial end faces of magnet 430. Shield 420 may be formed as a lining material within an inner surface of sleeve 12. Shield 420 may extend beyond ends of permanent magnet 430.

Shield 420 may include material that is highly conductive and non-magnetic compared to the sleeve and magnet such that eddy current losses are reduced. Examples of such material include copper, aluminum, silver, gold or any other suitably conductive and non-magnetic material may be used. Shield 420 comprises a material that has a conductivity that is at least about a magnitude of five times higher than the larger of the conductivities of materials comprising sleeve 12 and magnet 430. Conductivity of shield material may typically be in the range of $6 \times 10^6$ to $7 \times 10^6$ Siemens/meter.

Because shield 420 is highly conductive compared to sleeve 12 and magnet 430, it provides a flow path for the eddy currents. Eddy currents are generated substantially in shield 420, rather than in sleeve 12 and magnet 430. Because shield 420 has low electrical resistance relative to the electrical resistance of sleeve 12 or the magnet 430, a minimal amount of heat is generated by the eddy currents that flow in shield 420.

Eddy currents, which would otherwise penetrate through the sleeve and cause eddy current losses in the rotor, are greatly reduced by shield 420. Shield 420, however, may cause an increase in eddy current losses caused by tooth ripple harmonics. To minimize the effects of tooth ripple harmonics, shield 420 may be spaced by the annular width of the sleeve 12 from the stator teeth 400. Consequently, the existence of shield 420 would reduce winding harmonics losses much more than it would increase tooth ripple losses. Therefore, the total eddy current loss would be reduced.

Tables 1 and 2 below illustrate eddy current losses for various shield thicknesses. Table 1 includes harmonic losses data based on an INCONEL™ sleeve and a copper shield. INCONEL™ is a registered trademark of Inco Alloys International, Inc. Table 2 includes harmonic losses data based on a carbon fiber sleeve and a copper shield.

TABLE 1

Eddy Current Losses With An INCONEL ™ Sleeve*

Switching and Other Winding Harmonics Caused Losses

| Shield Thickness (mil) | Magnet Section (W) | Sleeve Section (W) | Shield Section (W) | Tooth Ripple Loss (W) | Total Eddy Current Loss (W) |
|---|---|---|---|---|---|
| 20 | 1.1 | 27 | 19 | 39 | 86.1 |
| 15 | 1.9 | 26 | 23 | 29 | 79.9 |
| 10 | 4.1 | 27 | 30 | 21 | 82.1 |
| 5 | 13 | 34 | 39 | 15 | 101.0 |
| 0 | 65 | 94 | 0 | 10 | 169.0 |

*With a constant magnet outer diameter of 1.072 inches and a constant sleeve radial thickness of 0.08 inches.

TABLE 2

Eddy Current Losses With A Carbon Fiber Sleeve*

| Shield Thickness (mil) | Magnet Section (W) | Switching and Other Winding Harmonics Caused Losses | | Tooth Ripple Loss (W) | Total Eddy Current Loss (W) |
|---|---|---|---|---|---|
| | | Sleeve Section (W) | Shield Section (W) | | |
| 20 | 1.3 | 0 | 22 | 2 | 25.3 |
| 15 | 2.3 | 0 | 27 | 1.6 | 30.9 |
| 10 | 5.2 | 0 | 37 | 1.2 | 43.4 |
| 5 | 19 | 0 | 57 | 0.7 | 76.7 |
| 0 | 140 | 0 | 0 | 0 | 140.0 |

*With a constant magnet outer diameter of 1.072 inches and a constant sleeve radial thickness of 0.08 inches Shield 420 may be formed in a thickness that provides acceptable electrical conductive performance. In a currently preferred embodiment, shield 420 is approximately 0.020 inches thick.

Positioning shield 420 inside sleeve 12, minimizes the total eddy current losses for various shield thicknesses. In examples shown in Tables 1 and 2, increasing the shield thickness from 0 to 20 mils per inch of diameter may slightly increase tooth ripple loss from 0 W to 2 W. However, a considerable reduction in total eddy current losses from 140.0 W to 25.3 W may be realized because a total of eddy current losses associated with the rotor is the based on "switching losses," "winding harmonics losses" and "tooth ripple losses," and the reduction in magnitude of "winding harmonics losses" considerably overcomes the increase in "tooth ripple losses."

Alternatively, referring to FIG. 3d, shield 420 may be positioned outside sleeve 12. To minimize potential tooth ripple loss and eddy current losses, shield 420 may be spaced at a sufficient distance from stator teeth 400. Shield 420 may be spaced from the stator teeth 400 at a distance approximately equal to the annular width of the sleeve 12. The spacing could be provided using a higher diameter stator or a lower diameter rotor. Shield 420 may have portions 420a, 420b that extend beyond axial ends 14a, 14b of permanent magnet 430.

Referring to FIG. 3e, in accordance with another embodiment, shield 420 may be positioned as a central core and permanent magnet 430 may surround shield 420. Permanent magnet 430 may be ring shaped, and may be a single piece or multiple pieces held together inside sleeve 12. Shield 420 may be formed in a diameter that provides acceptable electrical conductive performance.

In another embodiment illustrated in FIG. 3f, sleeve 12 may be made of a highly conductive nonmagnetic material, and a separate shield may not be provided. Because sleeve 12 would be highly conductive compared to magnet 430, sleeve 12 would provide a flow path for the eddy currents. Eddy currents would be generated substantially in sleeve 12, rather than in magnet 430. Because sleeve 12 would have low resistance relative to resistance of magnet 430, a minimum amount of heat would be generated by the eddy current that would flow in sleeve 12.

Referring to FIG. 4a, in accordance with another embodiment, rotor 500 may have a shaft 510 and journal bearings 15A and 15B rotatably supporting the shaft 510. Rotor 500 would be disposed in motor/generator 10 and would be surrounded by stator 14. Mechanical link 76 may mechanically constrain compressor impeller 42 to shaft 510 causing rotor 500 and the magnet disposed therein to rotate when compressor impeller 42 rotates. Shield 420 may be located between permanent magnet 430 and shaft 510. Permanent magnet 430 may be ring shaped, and may be a single piece or multiple pieces held together inside sleeve 12. Alternatively, referring to FIG. 4b, shield 420 may be positioned between sleeve 12 and magnet 430. In another alternate embodiment illustrated in FIG. 4c, rotor 500 would include shaft 510 surrounded by permanent magnet 430. Shield 420 would be located between permanent magnet 430 and shaft 510. Journal bearings 15A and 15B would rotatably support shaft 510.

While the invention has been described in detail, those familiar with the art to which this invention relates will recognize various alternative designs and embodiments for practicing the invention within the scope of the appended claims.

What is claimed is:

1. A turbogenerator system, comprising: an elongated shaft; a turbine mounted for rotation on said shaft; an electrically conductive nonmagnetic sleeve coupled with said shaft for rotation therewith; a stator surrounding said electrically conductive nonmagnetic sleeve; at least one magnet mounted within said electrically conductive nonmagnetic sleeve; and a shield surrounding said at least one magnet and located between said electrically conductive nonmagnetic sleeve and said at least one magnet, said shield made of electrically conductive nonmagnetic material.

2. The turbogenerator system of claim 1, further including a plurality of impeller blades attached to said electrically conductive nonmagnetic sleeve distal of said shaft to move cooling air.

3. The turbogenerator system of claim 1, wherein said at least one magnet is cylindrical.

4. The turbogenerator system of claim 1, wherein said electrically conductive nonmagnetic sleeve has a portion that is annular.

5. The turbogenerator system of claim 1, wherein said shield has a portion that is annular.

6. The turbogenerator system of claim 1, wherein said shield reduces a rotor eddy current loss.

7. The turbogenerator system of claim 1, wherein said shield includes a material coupled to an inside surface of said electrically conductive nonmagnetic sleeve.

8. The turbogenerator system of claim 1, wherein a material forming said shield has a lower electrical resistivity than a material forming said electrically conductive nonmagnetic sleeve.

9. The turbogenerator system of claim 1, wherein said shield is between about 0.001 and about 0.040 inches thick.

10. The turbogenerator system of claim 1, wherein said shield is between 0.005 and 0.020 inches thick.

11. The turbogenerator system of claim 1. wherein said electrically conductive nonmagnetic sleeve is non-metallic.

12. The turbogenerator system of claim 1, wherein a material forming said shield has a conductivity greater than 5 times a conductivity of a material forming said electrically conductive nonmagnetic sleeve and a material forming said at least one magnet.

13. A magnet apparatus, comprising: a stator; and a magnet rotor mounted for rotation within said stator, said rotor including a magnet, an electrically conductive nonmagnetic shield, and an electrically conductive nonmagnetic sleeve, wherein said electrically conductive nonmagnetic shield is located between said magnet and said electrically conductive nonmagnetic sleeve.

14. The apparatus of claim 13, wherein said shield is positioned outside said magnet.

15. The apparatus of claim 13, wherein said magnet is cylindrical.

16. The apparatus of claim 13, wherein said electrically conductive nonmagnetic sleeve has a portion that is annular.

17. The apparatus of claim 13, wherein said electrically conductive nonmagnetic shield has a portion that is annular.

18. The apparatus of claim 13, wherein said electrically conductive nonmagnetic shield reduces a rotor eddy current loss.

19. The apparatus of claim 13, wherein said electrically conductive nonmagnetic shield includes a material coupled to an inside surface of said electronically conductive nonmagnetic sleeve.

20. The apparatus of claim 13, wherein material forming said shield has a lower electrical resistivity than material forming said sleeve.

21. The apparatus of claim 13, wherein said electrically conductive nonmagnetic shield is between about 0.001 and about 0.040 inches thick.

22. The apparatus of claim 13, wherein said shield is between 0.005 and 0.020 inches thick.

23. The apparatus of claim 13, wherein said electrically conductive nonmagnetic sleeve is non-metallic.

24. The apparatus of claim 13, wherein a material forming said electrically conductive nonmagnetic shield has a conductivity greater than 10 times a conductivity of a material forming said electrically conductive nonrnagnetic sleeve and a material forming said magnet.

25. A magnet rotor, comprising: a cylindrical magnet having a cylindrical magnet outer surface; an electrically conductive nonmagnetic annular shield having an inner annular surface in contact with said cylindrical magnet outer surface, said electrically conductive nonmagnetic annular shield having an annular shield outer surface; an annular electrically conductive nonmagnetic sleeve having an annular sleeve inner surface in contact with said annular shield outer surface; and wherein a resistivity of said electrically conductive nonmagnetic annular shield is lower than a resistivity of said annular electrically conductive nonmagnetic sleeve.

26. A method for reducing an eddy current loss in a magnet rotor, comprising: providing a magnet stator; providing a magnet rotor capable of rotating about an axis disposed within said stator, said rotor including a magnet, an electrically conductive nonmagnetic shield, and an electrically conductive nonmagnetic sleeve, wherein said electrically conductive nonmagnetic shield has portions positioned inside said electrically conductive nonmagnetic sleeve, and said magnet has portions positioned inside said electrically conductive nonmagnetic shield; and rotating said magnet rotor such that said shield reduces said eddy current loss.

27. A method of reducing an eddy current loss, comprising: providing a cylindrical magnet having a cylindrical magnet outer surface; providing an electrically conductive nonmagnetic annular shield having an inner annular surface in contact with said cylindrical magnet outer surface, said electrically conductive nonmagnetic annular shield having an annular shield outer surface; providing an electrically conductive nonmagnetic annular sleeve having an annular sleeve inner surface in contact with said annular shield outer surface, wherein a resistivity of said electrically conductive nonmagnetic annular shield is lower than a resistivity of said electrically conductive nonmagnetic sleeve; and generating an eddy current in said shield such that said eddy current loss is reduced.

28. A generator/motor, comprising: a Stator; a sleeve mounted for rotation within said stator; at least one magnet positioned within said sleeve for rotation therewith; and a shield surrounding said at least one magnet to rotate therewith, said shield disposed between said at feast one magnet and said sleeve, said shield made of electrically conductive nonmagnetic material.

* * * * *